United States Patent
Beskrovny et al.

(10) Patent No.: US 9,158,848 B2
(45) Date of Patent: Oct. 13, 2015

(54) WEB TESTING TOOLS SYSTEM AND METHOD

(71) Applicant: International Business Machines Corporation, Armonk, NY (US)

(72) Inventors: Evgeny Beskrovny, Ramat Gan (IL); Salvatore Angelo Guamieri, New York, NY (US); Marco Pistoia, Amawalk, NY (US); Omer Tripp, Har-Adar (IL)

(73) Assignee: International Business Machines Corporation, Armonk, NY (US)

(*) Notice: Subject to any disclaimer, the term of this patent is extended or adjusted under 35 U.S.C. 154(b) by 227 days.

(21) Appl. No.: 13/763,835

(22) Filed: Feb. 11, 2013

(65) Prior Publication Data

US 2014/0229463 A1    Aug. 14, 2014

(51) Int. Cl.
*G06F 9/45* (2006.01)
*G06F 17/30* (2006.01)

(52) U.S. Cl.
CPC .............................. *G06F 17/30864* (2013.01)

(58) Field of Classification Search
CPC ................. G06F 11/3688; G06F 17/30864
See application file for complete search history.

(56) References Cited

U.S. PATENT DOCUMENTS

| | | | |
|---|---|---|---|
| 6,601,233 B1 * | 7/2003 | Underwood | 717/102 |
| 6,934,934 B1 * | 8/2005 | Osborne et al. | 717/126 |
| 2002/0083418 A1 * | 6/2002 | Saxe et al. | 717/126 |
| 2005/0132333 A1 | 6/2005 | Neumann et al. | |
| 2005/0229044 A1 * | 10/2005 | Ball | 714/38 |
| 2007/0088740 A1 * | 4/2007 | Davies et al. | 707/103 R |
| 2007/0124726 A1 | 5/2007 | Qureshi et al. | |
| 2007/0169019 A1 * | 7/2007 | Leino et al. | 717/136 |
| 2008/0077780 A1 * | 3/2008 | Zingher | 712/227 |
| 2008/0127101 A1 | 5/2008 | Anafi et al. | |
| 2009/0031018 A1 * | 1/2009 | Conkright et al. | 709/224 |
| 2009/0063217 A1 * | 3/2009 | Barros | 705/7 |
| 2009/0077532 A1 * | 3/2009 | Denney et al. | 717/106 |
| 2009/0164996 A1 * | 6/2009 | Baeuerle et al. | 718/100 |
| 2009/0320119 A1 * | 12/2009 | Hicks et al. | 726/9 |
| 2010/0088548 A1 * | 4/2010 | Gulwani et al. | 714/38 |
| 2011/0010612 A1 * | 1/2011 | Thorpe et al. | 715/234 |
| 2011/0030061 A1 * | 2/2011 | Artzi et al. | 726/25 |
| 2011/0138369 A1 * | 6/2011 | Chandra et al. | 717/133 |
| 2011/0271231 A1 * | 11/2011 | Lategan | 715/810 |
| 2012/0011489 A1 * | 1/2012 | Murthy et al. | 717/126 |
| 2012/0030664 A1 * | 2/2012 | Demant et al. | 717/171 |
| 2012/0179935 A1 * | 7/2012 | Wang et al. | 714/32 |
| 2012/0311713 A1 * | 12/2012 | Amit et al. | 726/25 |

FOREIGN PATENT DOCUMENTS

| | | |
|---|---|---|
| EP | 0 666 535 A2 | 8/1995 |
| EP | 2 012 490 A1 | 1/2009 |

* cited by examiner

*Primary Examiner* — Chameli Das
(74) *Attorney, Agent, or Firm* — Holland & Knight LLP; Brian J. Colandreo, Esq.; Jeffrey T. Placker, Esq.

(57) ABSTRACT

A method, computer program product, and computer system for analyzing, by a computing device, client-side code of a web component. An input constraint of the web component is identified based upon, at least in part, analyzing the client-side code of the web component. One or more input values within the input constraint are generated based upon, at least in part, the input constraint.

12 Claims, 7 Drawing Sheets

WEB TESTING TOOLS SYSTEM AND METHOD

BACKGROUND

The operation of web analysis tools (e.g., web security testing engines) may be based on an initial crawling stage, where the web analysis tool may explore the subject web component (e.g., web application, web service, network service, etc.), and attempt to record as much of the interaction surface as possible. The coverage by the web analysis tool for the web component may depend on such things as, e.g., the quality of its crawling capabilities. For example, if the crawling capabilities are limited, thereby missing large (e.g., relevant) portions of the web component's functionality (e.g., web pages in a website), then the subsequent analysis stage may similarly be limited and incomplete.

For instance, some dynamic web analysis tools may have simple crawling heuristics, and may be backed by complex and tedious user configurations. For example, some dynamic web analysis tools may use default values, e.g., when filling fields of an HTML form, as well as allowing a user to manually specify other values, along with a regular expression for a field identifier, such that if the regular expression matches a field name in the form, then the value provided by the user may be used. As such, use of such dynamic web analysis tools may be onerous to the user, reduce the quality of crawling, and thus reduce the coverage achieved by the analysis.

BRIEF SUMMARY OF DISCLOSURE

In one implementation, a method, performed by one or more computing devices, comprises analyzing, by a computing device, client-side code of a web component. An input constraint of the web component is identified based upon, at least in part, analyzing the client-side code of the web component. One or more input values within the input constraint are generated based upon, at least in part, the input constraint.

One or more of the following features may be included. The one or more input values may include one or more fillable form input values of the web component. At least one request that includes the one or more input values may be sent to a second computing device. A response may be received from the second computing device based upon, at least in part, the at least one request sent to the second computing device. The analysis may include a weakest-preconditions technique. The weakest-preconditions technique may include identifying a designated control location in the client-side code of the web component. The designated control location in the client-side code of the web component may include at least one validation function.

In another implementation, a computing system includes a processor and a memory configured to perform operations comprising analyzing, by a computing device, client-side code of a web component. An input constraint of the web component is identified based upon, at least in part, analyzing the client-side code of the web component. One or more input values within the input constraint are generated based upon, at least in part, the input constraint.

One or more of the following features may be included. The one or more input values may include one or more fillable form input values of the web component. At least one request that includes the one or more input values may be sent to a second computing device. A response may be received from the second computing device based upon, at least in part, the at least one request sent to the second computing device. The analysis may include a weakest-preconditions technique. The weakest-preconditions technique may include identifying a designated control location in the client-side code of the web component. The designated control location in the client-side code of the web component may include at least one validation function.

In another implementation, a computer program product resides on a computer readable storage medium that has a plurality of instructions stored on it. When executed by a processor, the instructions cause the processor to perform operations comprising analyzing, by a computing device, client-side code of a web component. An input constraint of the web component is identified based upon, at least in part, analyzing the client-side code of the web component. One or more input values within the input constraint are generated based upon, at least in part, the input constraint.

One or more of the following features may be included. The one or more input values may include one or more fillable form input values of the web component. At least one request that includes the one or more input values may be sent to a second computing device. A response may be received from the second computing device based upon, at least in part, the at least one request sent to the second computing device. The analysis may include a weakest-preconditions technique. The weakest-preconditions technique may include identifying a designated control location in the client-side code of the web component. The designated control location in the client-side code of the web component may include at least one validation function.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
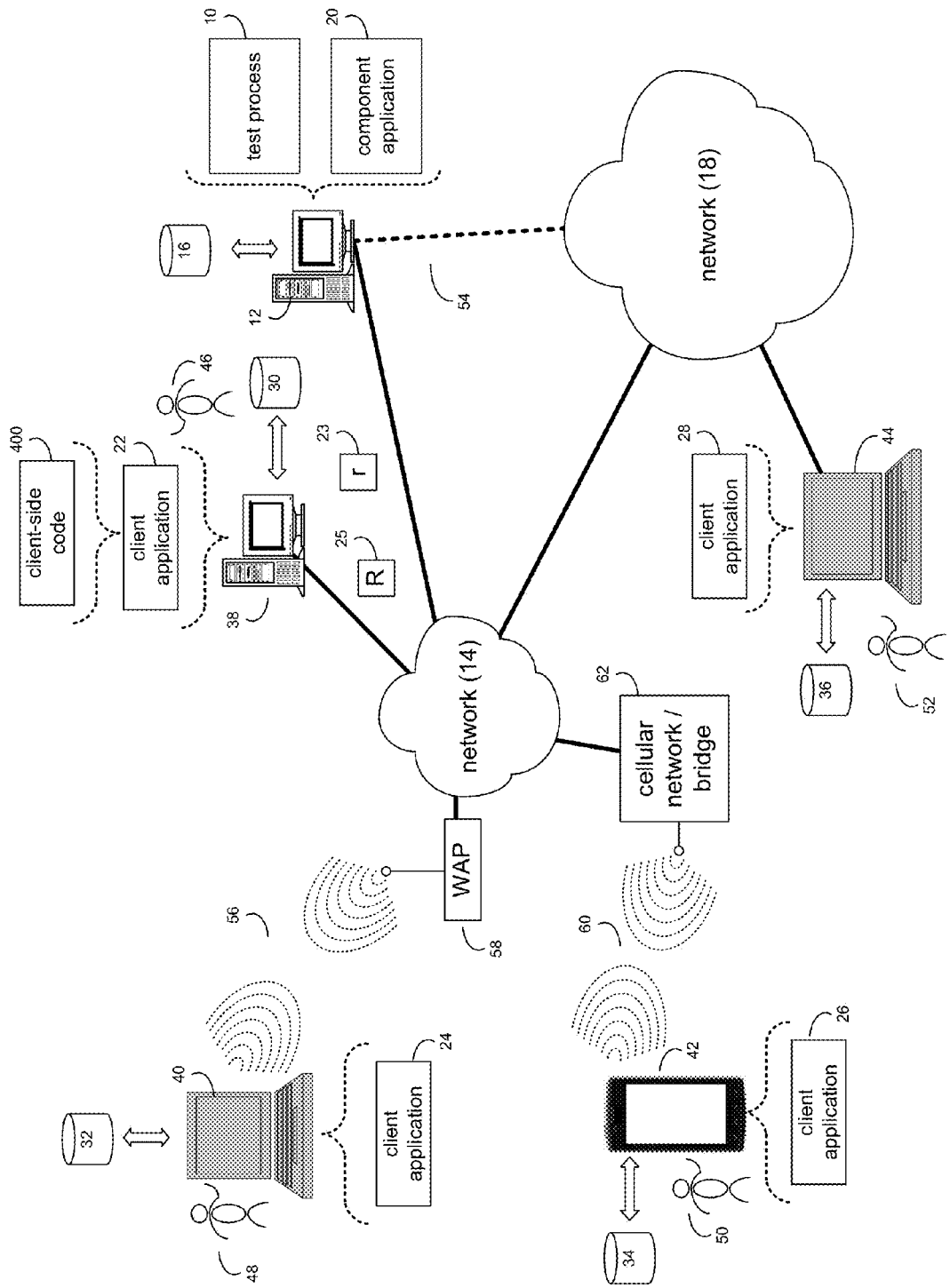
FIG. 1 is an illustrative diagrammatic view of a test process coupled to a distributed computing network according to one or more implementations of the present disclosure.

System Overview:

As will be appreciated by one skilled in the art, the present disclosure may be embodied as a method, system, or computer program product. Accordingly, the present disclosure may take the form of an entirely hardware implementation, an entirely software implementation (including firmware, resident software, micro-code, etc.) or an implementation combining software and hardware aspects that may all generally be referred to herein as a "circuit," "module" or "system."

Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. The computer-usable, or computer-readable, storage medium (including a storage device associated with a computing device or client electronic device) may be, for example, but not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of this document, a computer-usable or computer-readable, storage medium may be any tangible medium that can contain or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

Computer program code for carrying out operations of the present disclosure may be written in an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript or PERL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider).

The flowchart and block diagrams in the figures illustrate the architecture, functionality, and operation of possible implementations of apparatus (systems), methods and computer program products according to various implementations of the present disclosure. It will be understood that each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring to FIG. 1, there is shown test process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, test process 10 may, via a computing device, analyze client-side code 400 of a web component. An input constraint of the web component may be identified based upon, at least in part, analyzing the client-side code of the web component. One or more input values within the input constraint may be generated based upon, at least in part, the input constraint.

The instruction sets and subroutines of test process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, etc.) and may be located within any suitable memory location, such as storage device 16 coupled to computer 12. Any data described throughout may be stored in the data store. In some implementations, computer 12 may utilize a database management system such as, but not limited to, "My Structured Query Language" (MySQL®) in order to provide multi-user access to one or more databases, such as the above noted relational database. The data store may also be a custom database, such as, for example, a flat file database or an XML database. Any other form(s) of a data storage structure and/or organization may also be used. Test process 10 may be a component of the data store, a stand alone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute a component application (e.g., component application 20), examples of which may include, but are not limited to, e.g., a web application, a web service application, a network service application, web analysis tools, or other custom application. Test process 10 and/or component application 20 may be accessed via client applications 22, 24, 26, 28. Test process 10 may be a stand alone application, or may be an applet/application/script that may interact with and/or be executed within component application 20 and/or one or more of client applications 22, 24, 26, 28. Component application 20 may be a stand alone application, or may be an applet/application/script that may interact with and/or be executed within test process 10 and/or one or more of client applications 22, 24, 26, 28. One or more of client applications 22, 24, 26, 28 may be a stand alone application, or may be an applet/application/script that may interact with and/or be executed within test process 10 and/or component application 20. Examples of client applications 22, 24, 26, 28 may include, but are not limited to, e.g., a web application, a web service application, a network service application, web analysis tools, or other custom application, a standard and/or mobile web browser, an email client application, a textual and/or a graphical user interface, a customized web browser, a plugin, or a custom application. The instruction sets and subroutines of client applications 22, 24, 26, 28, which may be stored on storage devices 30, 32, 34, 36 coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart phone (e.g., client electronic device 42), a notebook computer (e.g., client electronic device 44), a tablet (not shown), a server (not shown), a data-enabled, cellular telephone (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

One or more of client applications 22, 24, 26, 28 may be configured to effectuate some or all of the functionality of test process 10 (and vice versa). Accordingly, test process 10 may be a purely server-side application, a purely client-side application, or a hybrid server-side/client-side application that is cooperatively executed by one or more of client applications 22, 24, 26, 28 and/or test process 10.

One or more of client applications 22, 24, 26, 28 may be configured to effectuate some or all of the functionality of component application 20 (and vice versa). Accordingly, component application 20 may be a purely server-side application, a purely client-side application, or a hybrid server-side/client-side application that is cooperatively executed by one or more of client applications 22, 24, 26, 28 and/or component application 20. As one or more of client applications 22, 24, 26, 28, test process 10, and component application 20, taken singly or in any combination, may effectuate some or all of the same functionality, any description of effectuating such functionality via one or more of client applications 22, 24, 26, 28, test process 10, component application 20, or combination thereof, and any described interaction(s) between one or more of client applications 22, 24, 26, 28, test process 10, component application 20, or combination thereof to effectuate such functionality, should be taken as an example only and not to limit the scope of the disclosure.

Users 46, 48, 50, 52 may access computer 12 and test process 10 directly through network 14 or through secondary network 18. Further, computer 12 may be connected to network 14 through secondary network 18, as illustrated with phantom link line 54. Test process 10 may include one or more user interfaces, such as browsers and textual or graphical user interfaces, through which users 46, 48, 50, 52 may access test process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi, and/or Bluetooth™ device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ is a telecommunications industry specification that allows, e.g., mobile phones, computers, smart phones, and other electronic devices to be interconnected using a short-range wireless connection.

Figure 2:
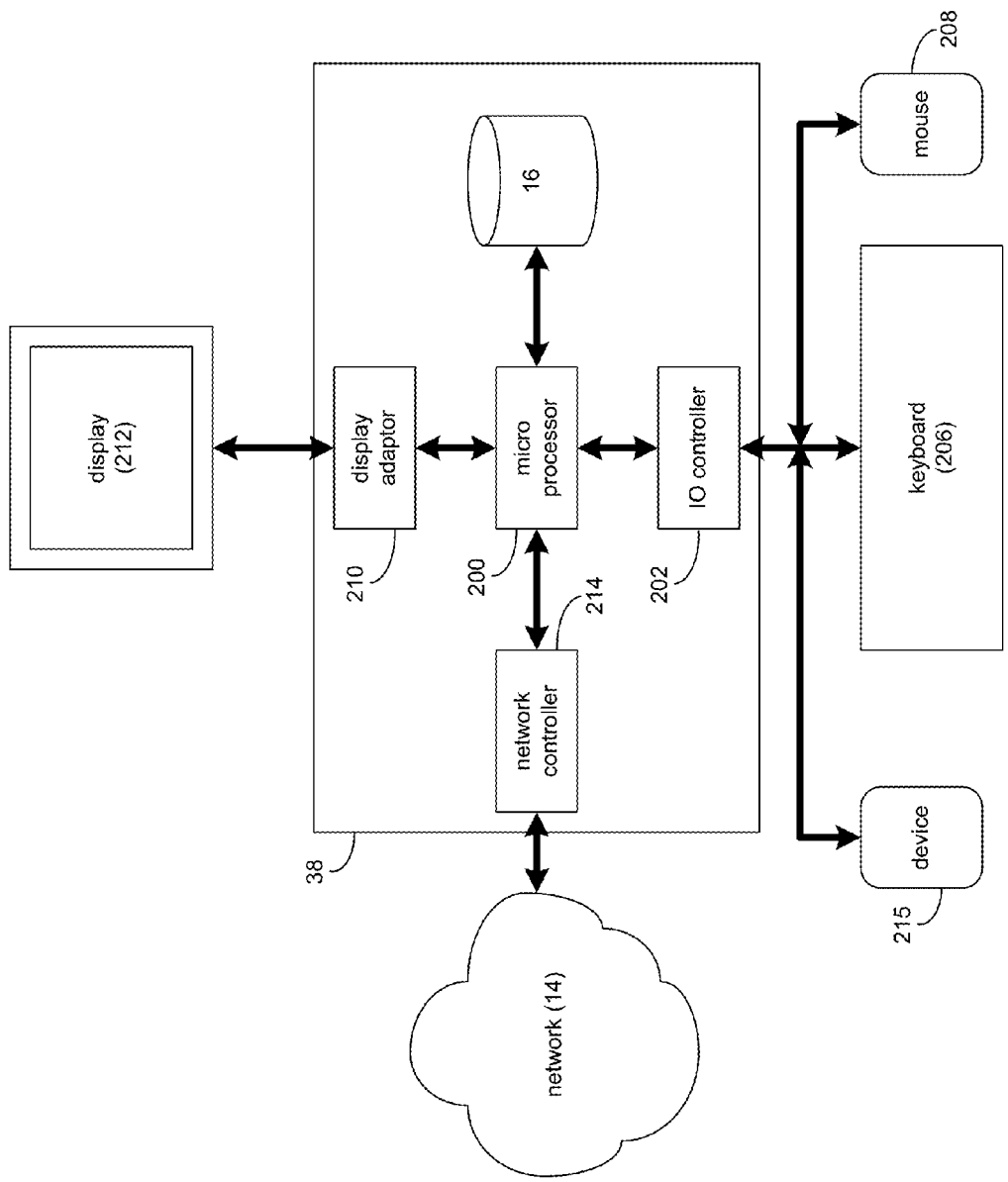
FIG. 2 is a diagrammatic view of a client electronic device of FIG. 1 according to one or more implementations of the present disclosure.
Figure 3:
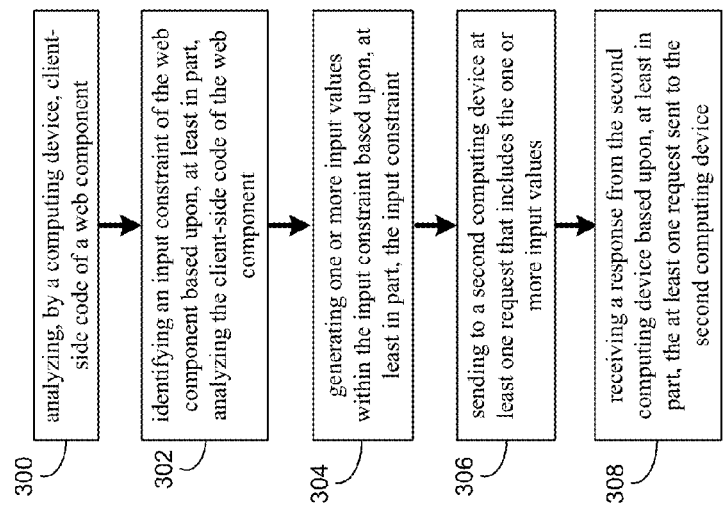
FIG. 3 is an illustrative flowchart of the test process of FIG. 1 according to one or more implementations of the present disclosure.
Figure 4A:
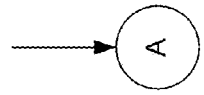
FIGS. 4a-4b is an illustrative client-side code of the test process of FIG. 1 according to one or more implementations of the present disclosure.
Figure 4B:
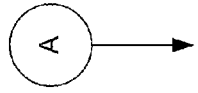

Referring also to FIG. 2, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, test process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device. An I/O controller (e.g., I/O controller 202) may be configured to couple microprocessor 200 with various devices, such as keyboard 206, pointing/selecting device (e.g., mouse 208), custom device (e.g., device 215), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

The Test Process:

As discussed above and referring also to FIGS. 3-6, test process 10 may analyze 300, by a computing device, client-side code of a web component. An input constraint of the web component may be identified 302 by test process 10 based upon, at least in part, analyzing 300 the client-side code of the web component. One or more input values within the input constraint may be generated 304 by test process 10 based upon, at least in part, the input constraint.

As discussed above, the operation of web analysis tools (e.g., web security testing engines) may be based on, e.g., an initial crawling stage, where the web analysis tool may explore the subject web component (e.g., web application, web service, network service, etc.), and may attempt to record as much of the interaction surface as possible. The coverage by the web analysis tool for the web component may depend on such things as, e.g., the quality of its crawling capabilities. For example, if the crawling capabilities are limited, thereby missing large (e.g., relevant) portions of the web component's functionality (e.g., web pages in a website), then the subsequent analysis stage may similarly be limited and incomplete.

For instance, some dynamic web analysis tools may have simple crawling heuristics, and may be backed by complex and tedious user configurations. For example, some dynamic web analysis tools may use default values, e.g., when filling fields of an HTML form, as well as allowing a user to manually specify other values, along with a regular expression for a field identifier, such that if the regular expression matches a field name in the form, then the value provided by the user may be used.

In some implementations, test process 10 may, e.g., reduce (or obviate) the need for the user to manually specify such input values, which may improve the quality of crawling and thus improve the coverage achieved by the analysis. For example, test process 10 may guide the crawler's choice of input values into, e.g., forms/text boxes, etc.

Figure 5:
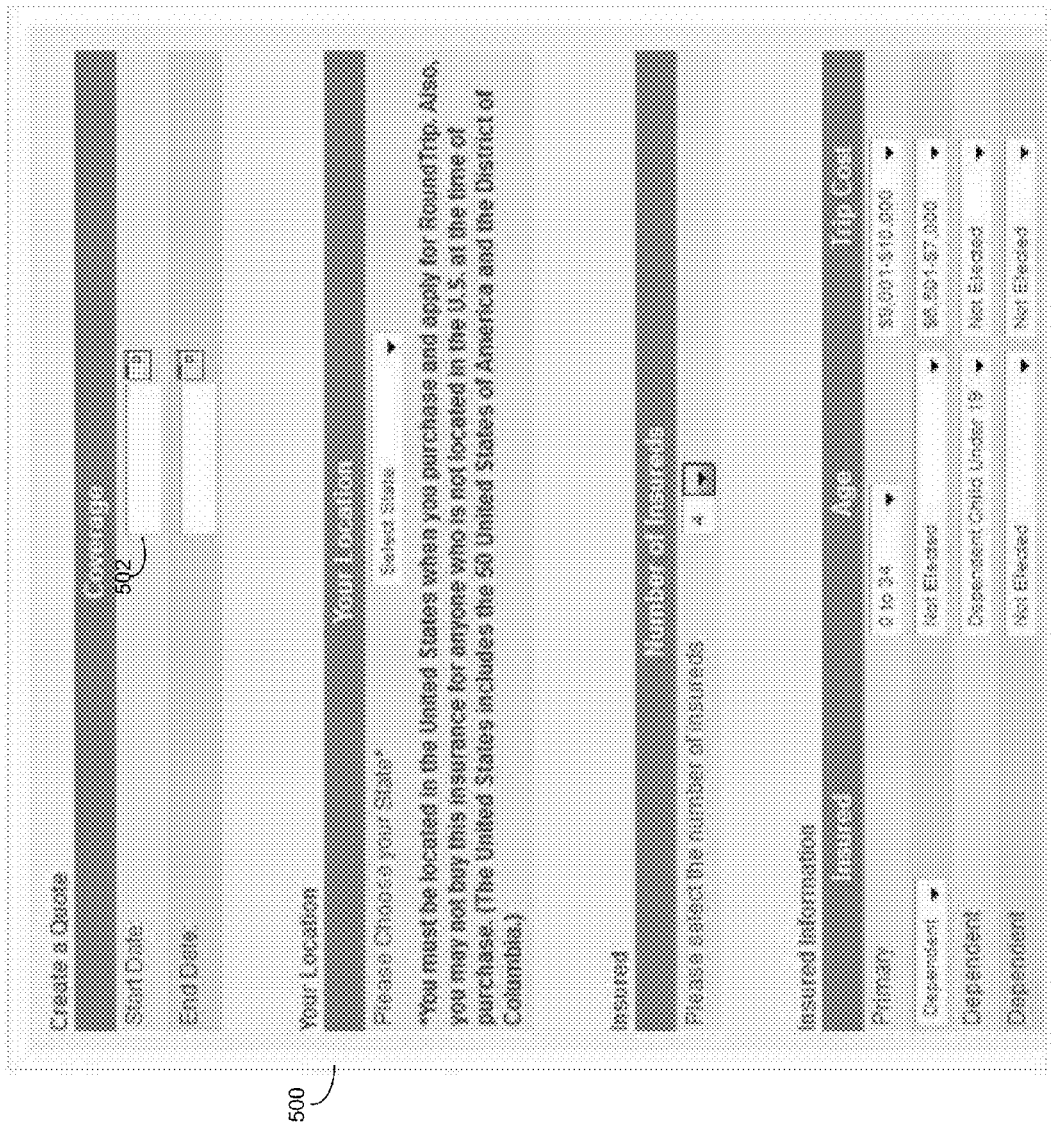
FIG. 5 is an illustrative diagrammatic view of a screen image displayed by the test process of FIGS. 4a-4b according to one or more implementations of the present disclosure.

For instance, in some implementations, test process 10 may analyze 300, by a computing device (e.g., client electronic device 38), client-side code (e.g., client-side code 400) of a web component (e.g., component application 20), which in the example, may include a web application executing on computer 12. In the example, client application 22 may include client-side code 400 of component application 20. For instance, FIG. 5 shows an example user interface (e.g., user interface 500 of test process 10) associated with client-side code 400 that may be rendered via display 212 of client electronic device 38. In some implementations, client-side code 400 and associated logic of component application 20 may enforce input constraints on input values that may be similar, if not identical, to those enforced at the "server"-side code and associated logic of component application 20 (or more generally, the component application's backend functionality) that may be resident at computer 12. In some implementations, the one or more input values may include one or more fillable form input values of component application 20. For instance, user interface 500 may include a portion of fillable forms (e.g., fillable form 502), however, other types of forms may be used without departing from the scope of the disclosure. In the example, an input constraint of client-side code 400 and/or component application 20 may include, e.g., a range of calendar dates for fillable form 502, age range of a user, as well as other input constraints.

In some implementations, the input constraint of the web component (e.g., component application 20) may be identified 302 by test process 10 based upon, at least in part, analyzing 300 client-side code 400 of component application 20. For instance, analysis 300 of the above-noted constraints of client-side code 400 of component application 20, which may be coded as, e.g., JavaScript validation functions or otherwise, may enable synthesis of meaningful input constraints on input values during crawling of (the server-side code and/or client-side code 400) of component application 20. In the example, the analysis 300 may include exploring the "server"-side code and associated logic of component application 20, e.g., without (i) relying on rich user selected specifications (e.g., input constraints of component application 20) of which input values to use and where to use them, and/or (ii) reducing or obviating the risk of arriving at error pages resulting from poor choices of one or more values.

In some implementations, the analysis 300 may include a weakest-preconditions technique. For example, in some implementations, the weakest-preconditions technique may include test process 10 obtaining preconditions on the input values, such that test process 10 may determine whether the input value satisfies the preconditions (e.g., of client-side code 400). In some implementations, the weakest-preconditions technique may include test process 10 identifying a designated control location (e.g., designated control location 402) in client-side code 400 of component application 20 and determining that the designated control location may have been reached.

Figure 6:
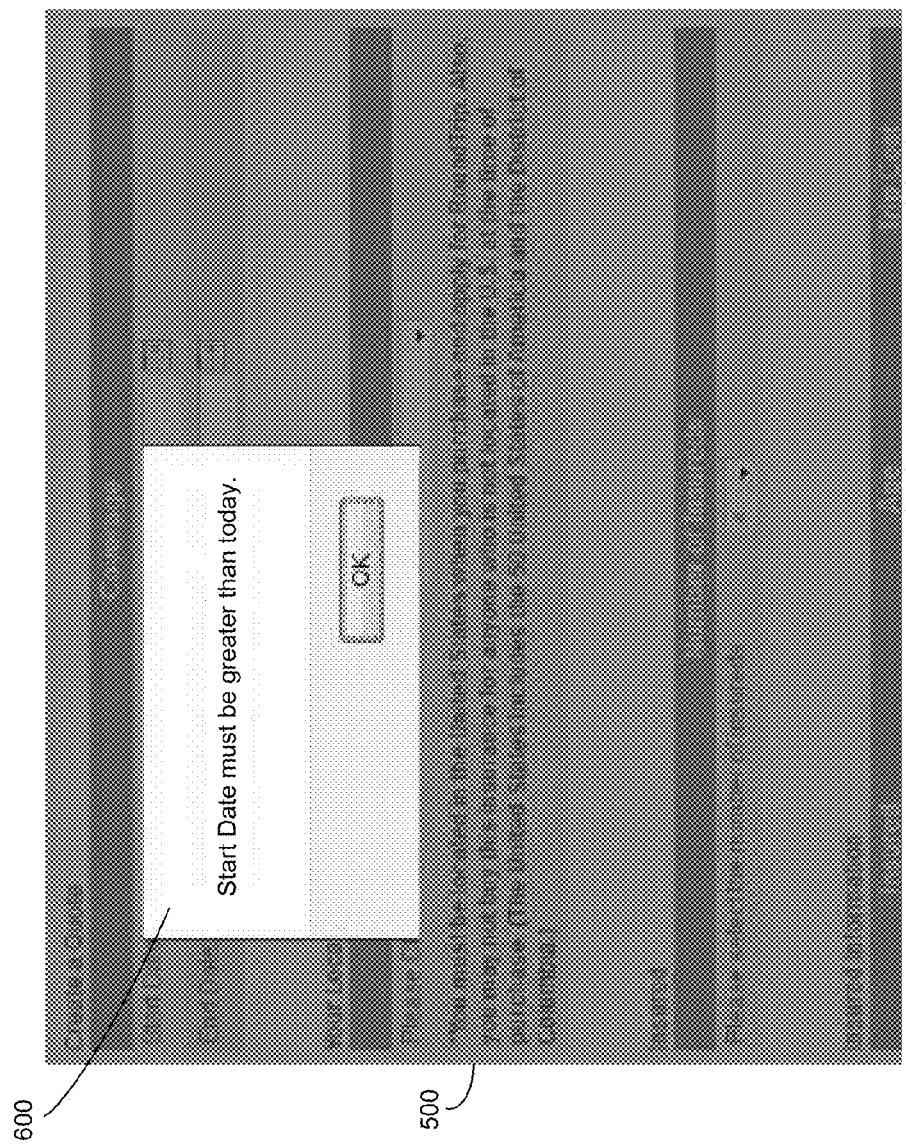
FIG. 6 is an illustrative diagrammatic view of a screen image displayed by the test process of FIGS. 4a-4b according to one or more implementations of the present disclosure.

For instance, and continuing with the above example, and referring at least to FIG. 6, user interface 500 is shown after an illegal choice of date (e.g., using a client-side calendar control) for the input constraint is selected. In the example, a popup window 600 may be rendered explaining the error (e.g., "Start Date must be greater than today"). In some implementations, designated control location 402 in client-side code 400 of component application 20 may include at least one validation function. For instance, the example JavaScript code (e.g., validation function code) of client-side code 400 may be responsible for popup window 600, and is shown at least in part at FIGS. 4a-4b at control location 402. In the example, at least a portion of client-side code 400 may be analyzed 300, e.g., using either static, dynamic (or hybrid) program-analysis techniques, such as those described above.

In some implementations, to have test process 10 reach control location 402, the input (of the input constraint) may be constrained in one or more ways, e.g., such that error="". For example: (document.frmquote.tripcostid_1.options [document.frmquote.tripcostid_1.options.selectedIndex].value== 0), (start > today && end >= start && end <= fullyearcoverage), etc.

Test process 10 may identify 302 these conditions (e.g., input constraints) on the input, via the above technique. In some implementations, test process 10 may include a constraint solver that may be used to synthesize an input payload that is consistent within some or all of the restrictions (e.g., input constraints).

In some implementations, one or more input values within the input constraint may be generated 304 by test process 10 based upon, at least in part, the input constraint. For example, as discussed above, at least a portion of client-side code 400 (e.g., control location 402) may be analyzed 300, e.g., using either the above-noted static, dynamic (or hybrid) program-analysis techniques. In the example, the input constraint for the above-noted range of calendar dates for fillable form 502 may be identified 302 from the analysis 300. Further in the example, the output generated 304 (e.g., based at least in part upon the analysis 300 and identification 302 discussed above) may include a choice of input values (e.g., range of calendar dates for fillable form 502) that pass the client-side validation of client-side code 400 (e.g., that are within the input constraint range of calendar dates for fillable form 502) as may be determined via control location 402. In the example, the generated 304 output may include one or more input values with a start date greater than the current day.

Continuing with the above example, and in some implementations, at least one request (e.g., r 23) that includes the one or more input values may be sent 306 to a second computing device (e.g., via test process 10), such as computer 12. For example, the above-noted input payload (e.g., input value(s)) may be iteratively used by test process 10 for more effective crawling (e.g., as a smarter selection of input values is used for the input payload). Thus, a more effective crawling may be enabled without using default/empty values (e.g., expecting the user to specify other values manually if desired), which may result in a more shallow crawling that may be unable to pass through forms, such as those shown at user interface 500.

In the above example, test process 10 (e.g., via client application 22) may send the request to component application 20 as part of the above-noted web analysis tools (e.g., of test process 10). The request may include the above-noted input value(s)/input payload generated 304 with the start date greater than the current day.

In some implementations, a response (e.g., R 25) may be received 308 from the second computing device (e.g., via test process 10) based upon, at least in part, the at least one request sent 306 to computer 12. The response may include, for example, information regarding, e.g., the interaction of the client-side code of component application 20 with the above-noted response. The interaction may include, for example, an indication as to whether or not the request, using the generated 304 input values, succeeded or failed. Such information may be used, e.g., by the above-noted web analysis tools for analyzing component application 20 with increased coverage.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, and combinations thereof) are possible without departing from the scope of the disclosure defined in the appended claims.

What is claimed is:

1. A computer-implemented method comprising:
   analyzing, by a computing device, client-side code of a web component; wherein analyzing the client-side code includes dynamically analyzing the client-side code and utilizing weakest-precondition technique to obtain preconditions on the input value; wherein the weakest-preconditions technique includes identifying a designated control location in the client-side code of the web component; wherein the designated control location in the client-side code of the web component includes at least one validation function;
   identifying an input constraint of the web component based upon, at least in part, analyzing the client-side code of the web component; and
   generating one or more input values within the input constraint based upon, at least in part, the input constraint.

2. The computer-implemented method of claim 1 further comprising sending to a second computing device at least one request that includes the one or more input values.

3. The computer-implemented method of claim 2 further comprising receiving a response from the second computing device based upon, at least in part, the at least one request sent to the second computing device.

4. The computer-implemented method of claim 1 wherein the one or more input values include one or more fillable form input values of the web component.

5. A computing system including a processor and a memory configured to perform operations comprising:
   analyzing client-side code of a web component; wherein analyzing the client-side code includes dynamically analyzing the client-side code and utilizing a weakest precondition technique to obtain precondition on the input value; wherein the weakest-preconditions technique includes identifying a designated control location in the client-side code of the web component; wherein the designated control location in the client-side code of the web component includes at least one validation function;

identifying an input constraint of the web component based upon, at least in part, analyzing the client-side code of the web component; and generating one or more input values within the input constraint based upon, at least in part, the input constraint.

6. The computing system of claim 5 further comprising sending to a computing device at least one request that includes the one or more input values.

7. The computing system of claim 6 further comprising receiving a response from the computing device based upon, at least in part, the at least one request sent to the computing device.

8. The computing system of claim 5 wherein the one or more input values include one or more fillable form input values of the web component.

9. A computer program product residing on a computer readable non-transitory storage medium having a plurality of instructions stored thereon which, when executed by a processor, cause the processor to perform operations comprising:

analyzing client-side code of a web component; wherein analyzing the client-side code includes dynamically analyzing the client-side code and utilizing a weakest-precondition technique to obtain preconditions on the input value; wherein the weakest-preconditions technique includes identifying a designated control location in the client-side code of the web component; wherein the designated control location in the client-side code of the web component includes at least one validation function;

identifying an input constraint of the web component based upon, at least in part, analyzing the client-side code of the web component; and generating one or more input values within the input constraint based upon, at least in part, the input constraint.

10. The computer program product of claim 9 further comprising sending to a computing device at least one request that includes the one or more input values.

11. The computer program product of claim 10 further comprising receiving a response from the computing device based upon, at least in part, the at least one request sent to the computing device.

12. The computer program product of claim 9 wherein the one or more input values include one or more fillable form input values of the web component.

* * * * *